United States Patent
Smith

(10) Patent No.: US 12,355,725 B2
(45) Date of Patent: *Jul. 8, 2025

(54) SYSTEMS AND METHODS FOR BLOCKING SPOOFED TRAFFIC

(71) Applicant: Level 3 Communications, LLC, Denver, CO (US)

(72) Inventor: Brent W. Smith, Arvada, CO (US)

(73) Assignee: Level 3 Communications, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/640,567

(22) Filed: Apr. 19, 2024

(65) Prior Publication Data

US 2024/0267360 A1    Aug. 8, 2024

Related U.S. Application Data

(63) Continuation of application No. 16/592,544, filed on Oct. 3, 2019, now Pat. No. 11,968,174.

(60) Provisional application No. 62/741,289, filed on Oct. 4, 2018.

(51) Int. Cl.
*H04L 9/40* (2022.01)
*H04L 12/66* (2006.01)
*H04L 45/00* (2022.01)
*H04L 45/748* (2022.01)
*H04L 61/5007* (2022.01)
(Continued)

(52) U.S. Cl.
CPC .......... *H04L 63/0236* (2013.01); *H04L 12/66* (2013.01); *H04L 45/72* (2013.01); *H04L 45/748* (2013.01); *H04L 61/5007* (2022.05); *H04L 63/0263* (2013.01); *H04L 63/1416* (2013.01); *H04L 63/1466* (2013.01); *H04L 69/325* (2013.01); *H04L 45/04* (2013.01)

(58) Field of Classification Search
CPC ..... H04L 63/0236; H04L 12/66; H04L 45/72; H04L 45/748; H04L 61/5007; H04L 63/0263; H04L 63/1416; H04L 63/1466; H04L 69/325; H04L 45/04
See application file for complete search history.

(56) References Cited

U.S. PATENT DOCUMENTS

2007/0263548 A1    11/2007  Oguchi
2009/0016236 A1*    1/2009  Alcala ................... H04L 43/022
                                                                370/253

(Continued)

*Primary Examiner* — Cheng-Feng Huang

(57) ABSTRACT

Systems and methods for blocking spoofed traffic within communications networks include obtaining, at a computing system, routing information for an autonomous system of a communications network, the routing information identifying Internet Protocol (IP) addresses associated with the autonomous system. In response to receiving the routing information, the computing system generates a prefix list based on the routing information, the prefix list including one or more prefixes encompassing the IP addresses identified by the routing information. The computing system then transmits instructions to a network device of the communications network configured to cause the network device to update a filter function of the network device based on the prefix list such that the network device permits network traffic that originates from IP addresses within the prefixes of the prefix list.

19 Claims, 4 Drawing Sheets

(51) Int. Cl.
  *H04L 69/325* (2022.01)
  *H04L 45/02* (2022.01)

(56) References Cited

U.S. PATENT DOCUMENTS

| | | | |
|---|---|---|---|
| 2011/0264822 A1* | 10/2011 | Ferguson | H04L 45/60 709/235 |
| 2012/0020364 A1 | 1/2012 | Zinjuwadia | |
| 2016/0373405 A1 | 12/2016 | Miller | |
| 2017/0142031 A1 | 5/2017 | Mackie | |
| 2017/0272465 A1* | 9/2017 | Steele | H04L 63/1466 |
| 2018/0241717 A1 | 8/2018 | Bond | |
| 2020/0112544 A1 | 4/2020 | Smith | |

* cited by examiner

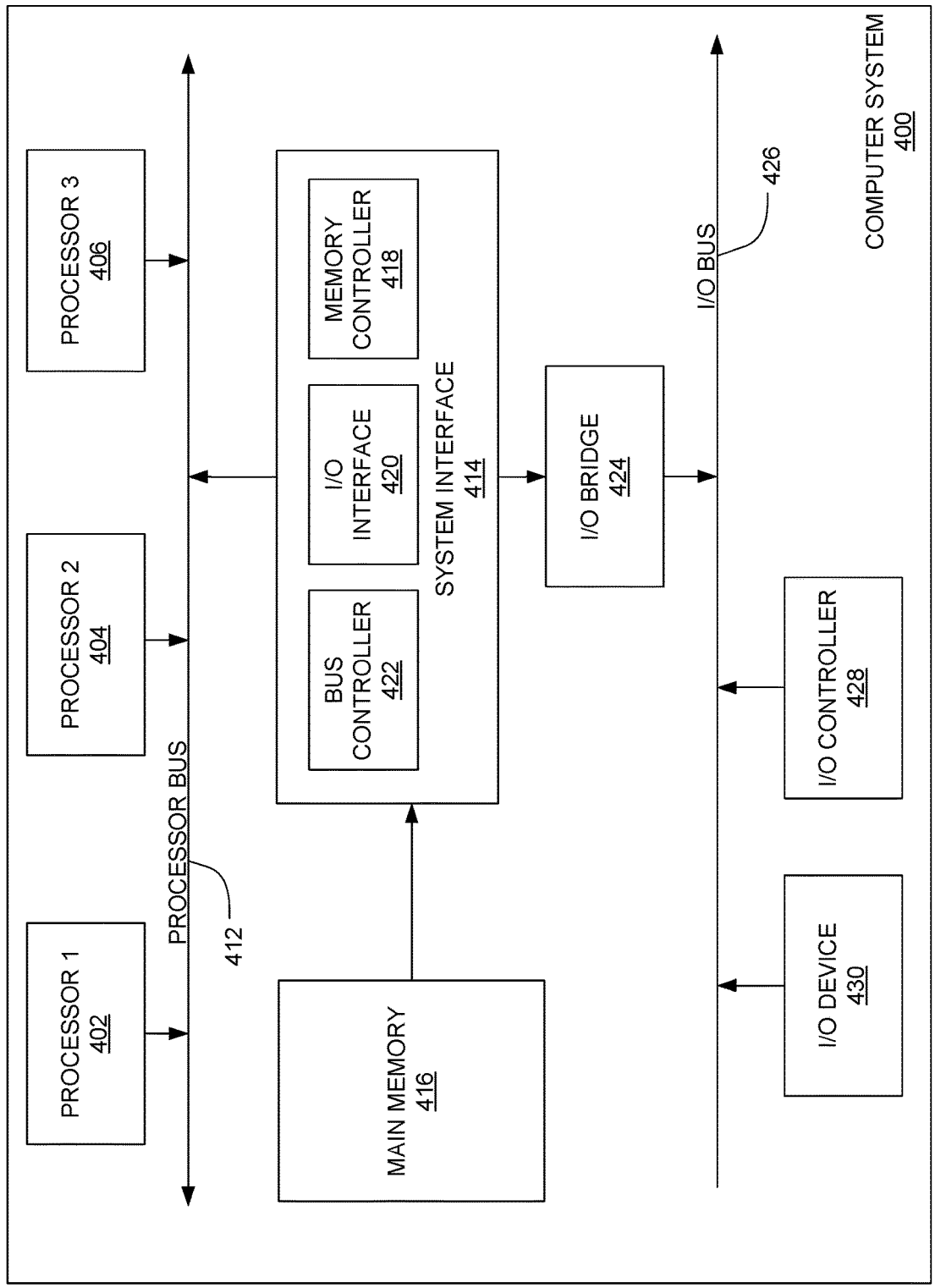

SYSTEMS AND METHODS FOR BLOCKING SPOOFED TRAFFIC

TECHNICAL FIELD

The present disclosure relates to network routing and more specifically to identifying and mitigating a potential spoofing of an Internet Protocol (IP) address of one or more communication packets incoming to a network.

BACKGROUND

Telecommunications and related computer networks provide for the transmission of information including, without limitation, voice, data, multimedia information, software (including patches and updates), various others forms of digital content, and digital services, among many other things. Such networks include servers or other computing and storage resources from which various forms of digital content and network services can be supplied to some device or devices—e.g., a client device. When a server is selected or otherwise contacted to provide requested content, a communication session may be established between the client device and the server to provide the content or resources to the requesting client device. The communication session may include the exchange of information and/or data routed between the devices in data packets. For example, requests for particular content (or other packets) may include an IP address of the client device transmitting the request (e.g., a source IP address), and may be resolved to an address for the server from which the content is being requested (e.g., a destination IP address). The request is then routed from the requesting client device by devices within the network to the server using the destination address. The server then serves responsive data, also in the form of packets, which packets are routed back to the requesting client device by inserting the address of the client device as the destination in the responsive packets.

In some instances, however, the source IP address of a communication packet (or stream of packets) may be falsified or "spoofed" to hide the identity of the device sending the packet or to direct responsive packets to specific devices. For example, a computing device connected to a network may alter a field in a header attached to or otherwise associated with a communication (e.g., a packet) such that the communication includes a source IP address that is different than the actual IP address of the device or network from which the communication originates. In certain cases, such techniques may be used to conceal the origin of the communication or to falsify the address of the source device to be a trusted device. In other cases, such techniques may be used to redirect responsive communications to a particular server, network device, network, or similar resource, potentially overloading or otherwise disrupting the resource.

In light of the foregoing, systems and methods for identifying and blocking spoofed traffic in an efficient and accurate manner are advantageous to the operation and security of telecommunications networks and are therefore desirable.

SUMMARY

In one aspect of the present disclosure, a method for blocking spoofed traffic within communications networks is provided. The method includes obtaining, at a computing system, routing information for an autonomous system of a communications network, the routing information identifying Internet Protocol (IP) addresses associated with the autonomous system. In response to receiving the routing information, the computing system generates a prefix list based on the routing information, the prefix list including one or more prefixes encompassing the IP addresses identified by the routing information. The computing system then transmits instructions to a network device of the communications network configured to cause the network device to update a filter function of the network device based on the prefix list such that the network device permits network traffic that originates from IP addresses within the prefixes of the prefix list.

In another aspect of the present disclosure, a system for use in blocking spoofed traffic within communications networks is provided. The system includes a computing system that further includes at least one processor and a memory. The memory includes instructions that, when executed by the at least one processor, cause the at least one processor to obtain routing information for an autonomous system of a communications network, the routing information identifying Internet Protocol (IP) addresses associated with the autonomous system. The instructions further cause the at least one processor to, in response to receiving the routing information, generate a prefix list based on the routing information, the prefix list including one or more prefixes encompassing the IP addresses identified by the routing information. The instructions further cause the at least one processor to transmit instructions to a network device of the communications network, the instructions configured to cause the network device to update a filter function of the network device based on the prefix list such that the network device permits network traffic that originates from IP addresses within the prefixes of the prefix list.

In yet another aspect of the present disclosure, another method for blocking spoofed traffic within communications networks is provided. The method includes generating, at a computing system, a prefix list from routing information associated with an autonomous system of a communications network, the prefix list including a plurality of prefixes encompassing trusted addresses within the autonomous system. The method further includes distributing the plurality of prefixes from the computing system to a filter device within the communications network, the distributing for implementation of a filter rule at the filter device, the filter rule permitting network traffic originating from addresses within the plurality of prefixes.

BRIEF DESCRIPTION OF THE DRAWINGS

FIG. 4 is a diagram illustrating an example of a computing system which may be used in implementing embodiments of the present disclosure.

DETAILED DESCRIPTION

Figure 1:
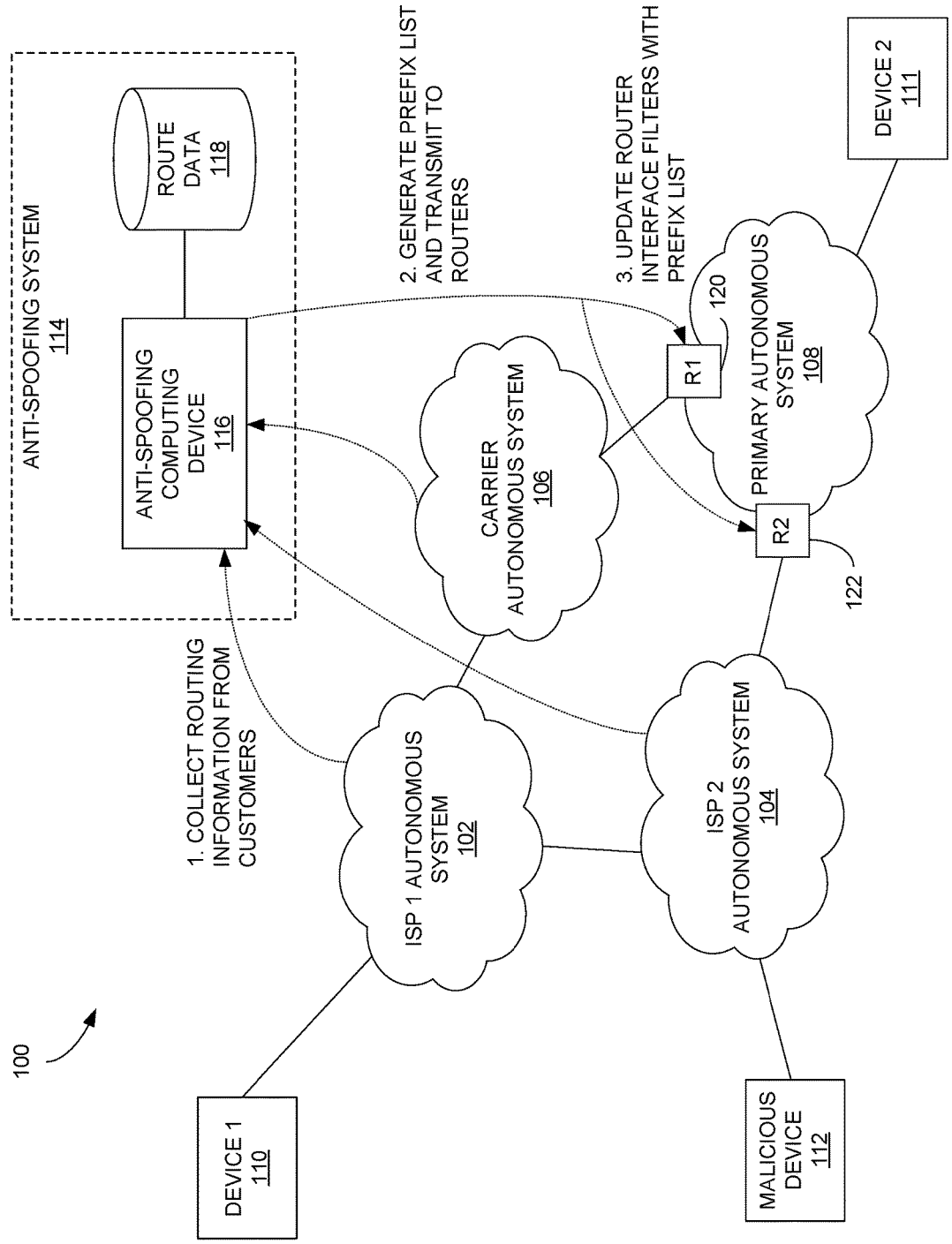
FIG. 1 is an example network environment including anti-spoofing functionality.

Aspects of the present disclosure are directed to systems and methods for blocking spoofed network and telecommunication traffic. In general, the systems and methods disclosed herein rely on an anti-spoofing system that collects advertised routing information from autonomous systems within the network. Based on the advertised routing information, the system identifies Internet Protocol (IP) addresses of trusted devices within the autonomous systems and generates lists of such addresses, which may be in the form of a list of prefixes (or similar aggregation) that includes the trusted IP addresses. The list of prefixes may then be used to update filtering functions for network devices (e.g., routers). More specifically, the system may transmit instructions and, in certain implementations, the list of prefixes itself that, when received by the network devices, cause the network devices to implement filter rules (or similar filter functionality) permitting network traffic originating from addresses encompassed by the prefix list.

Spoofing generally involves substitution of source IP addresses of packets to conceal the actual source of the packets, to impersonate a trusted device, to redirect responsive communications, or to perform other similar (and often malicious) activities. In a first example, an attacker may spoof a source IP address to appear to a receiving device as a known or trusted device. This type of spoofing can be used by network intruders to overcome certain network security measures. For example, many networks have internal systems that trust each other such that users can log into a system of the network without a username or password provided the system recognizes and/or trusts the device used to access the system. This is typically done by inspecting received packets to determine whether they have originated from a trusted device or otherwise accessing the device's IP address. As a result, by spoofing the IP address of an attacker device to appear as a trusted network or device, the attacker may gain illegitimate access to the system, destination network, or the like.

In another example, IP address spoofing may be used in distributed denial of service (DDoS) attacks. In a DDoS attack, a target device or network is flooded with requests for data from multiple devices, thereby overwhelming the target. When implementing a DDoS attack, an attacker may spoof the IP address of the requests to conceal the source of the requests. As a result, it is often difficult to determine whether traffic to the target is legitimate or whether traffic is utilizing spoofed IP addresses and is part of an attack.

There are various conventional approaches to identifying and addressing spoofing attacks. For example, the Internet Engineering Task Force's Best Current Practices 38 (BCP 38) provides guidance on addressing spoofing in the context of DDoS attacks. However, such conventional techniques are often too strict and commonly block legitimate traffic. As a result, network operators often do not employ such techniques because of the certainty of blocking significant amounts of legitimate traffic.

In light of the foregoing, aspects of the present disclosure involve systems, methods, computer program products, and the like, for identifying and blocking spoofed traffic while reducing, relative to other conventional techniques, blocking of legitimate traffic. To do so, implementations of the present disclosure involve network devices, such as routers, and associated router interface filters that are configured based on route registries containing information regarding routes owned and/or served by a network, device, or the like and which may route packets through the device.

Networking organizations, such as Internet Service Providers (ISPs), may be required to register the network routes that they either own or serve in various route registries. For example, in certain applications, a route registry may contain all routes that an Autonomous System (AS) (which may be running Border Gateway Protocol (BGP) routing) can legitimately advertise (e.g., routes under the control of and assigned to an ISP). In one specific example, a computing device associated with a network operator may access or query a route registry and build a prefix list for each customer of the network based on the customer's respective Autonomous System Number (ASN) or similar identifier. The computing device then generates router configurations for one or more routers within the network (the router configurations accounting for variations in router vendor, router type, and other router characteristics) and may then upload the prefix lists to routers (e.g., by updating router interface filters) having BGP sessions associated with the customer ASNs. By doing so, the routers will allow only legitimate, registered routes from each customer. The prefix lists may be regularly and automatically updated from the route registries and, as a result, corresponding updated configurations may be pushed to the routers without any manual intervention.

Generally, prefix lists are collections of network prefixes, which in turn are identifiers corresponding to subnetworks within a broader network. More specifically, every device connected to the Internet (or similar network) is assigned an IP address from a finite pool. For example, the two most common versions of IP in use today are Internet Protocol version 4 (IPv4), which relies on 32-bit addressing, and Internet Protocol version 6 (IPv6), which relies on 128-bit addressing. IP addresses in the IPv4 or the IPv6 pool can generally be considered to include at least two parts. The first part of the address, referred to as the network number or prefix, identifies a particular network while the second portion, referred to as a host number, identifies the particular node (e.g., a specific device or computer) within the Local Area Network (LAN) specified by the network section/prefix.

Routing prefixes may be expressed using Classless Inter-Domain Routing (CIDR) or "slash" notation. In general, slash notation provides both the first address of a network with the number of bits in the address corresponding to the prefix. So, in an example IPv4 address "192.0.128.0/24", the first address of the network is 192.0.128.0 with the first 24 bits corresponding to the prefix. In other words, the notation 192.0.128.0/24 corresponds to a network beginning at address 192.0.128.0 and with host addresses ranging from 192.0.128.0 to 192.0.128.255.

A similar concept regarding prefixes exists in IPv6, albeit taking advantage of the larger address space of IPv6 and various conventions for IPv6-compliant addressing. More specifically, an IPv6 address is generally divided into eight groupings (e.g., "2001:0db8:abcd:0012:0000:0000:0000:0000") in which the first three groupings correspond to a network address (e.g., 2001:0db8:abcd), the fourth grouping corresponds to a subnet address within the network specified by the first three groupings (e.g., 0012), and the remaining four groupings correspond to a device address within a given subnetwork. In such cases, the prefix is generally defined as the first four groupings, i.e., the combined network and subnetwork address. Despite the prefix occupying a designated portion of an IPv6 address, slash notation may nevertheless be used to indicate a range of devices within a given subnetwork. For example, the IPv6 address 2001:db8:abcd:0012::0/80 has a prefix of 2001:dv8:abcd:0012 and a device range from 2001:0DB8:ABCD:0012:0000:0000:0000:0000 to 0000:FFFF:FFFF:FFFF. In other words, the first 80 bits of the address are reserved for the prefix and as an offset for the device range.

Many conventional routers have the ability to filter traffic in and out of each port based on configured filters. These filters can match (filter) on various IP packet header fields such as source address, destination address, protocol, etc. Aspects of the present disclosure involve automatically updating or configuring such filters based on a prefix list for autonomous systems communicating within the network Among other advantages, relying on a prefix list for filtering functions may conserve device resources. For example, filtering on prefixes is generally less processor intensive as compared to filtering on full addresses due to the reduced number of computations and comparisons required. Implementing prefix lists may also conserve memory as multiple addresses on which filtering is to be conducted may be encompassed by a single prefix.

The systems and methods disclosed herein take prefix lists, such as those generated from the route registry tool described above, and implement the prefix lists in an interface filter between networks. For example, the interface filter may be implemented between customer networks (such as between ISP networks), between a customer network and a backbone network, or between a customer network and a content distribution network, among other locations within a broader telecommunications network. The interface filter may be deployed in or otherwise associated with any device, such as a router, that receives packets or otherwise may inspect packets flowing between such points. Once implemented, the filter matches incoming packets received on an interface (which may be a customer interface or edge device of some form) against the prefix list that contains the list of legitimate Internet routes associated with the interface (e.g., a customer connecting through the interface). The filter allows any packet having a source address within the ranges of IP addresses encompassed by the prefixes of the prefix list to pass through the filter but blocks any packets that have a source address that is not included in the prefixes of the prefix list. This approach may be automated such that the prefix lists are regularly updated per the route registries and then pushed to the devices in which filtering is occurring, thereby ensuring that the filters are maintained in a current and up-to-date state with respect to traffic to be blocked.

Provided each customer correctly registers all of the routes that they administer, the systems and methods disclosed herein would have the effect of allowing only packets sourced from legitimate IP address ranges associated with legitimate customers. Although traffic from unregistered prefixes associated with legitimate customers may be blocked and spoofed packets containing addresses from a registered address space may be allowed, the vast majority of spoofed attack traffic would be blocked as such traffic generally relies on random source addresses or addresses that do not exist on the originating network.

FIG. 1 is an example network environment 100 including an anti-spoofing system 114 adapted to facilitate blocking of spoofed network traffic within the network environment 100. In general, the network environment 100 includes multiple autonomous systems 102-108 to facilitate communication between devices. In the specific illustrated example, such communication occurs between a first device ("DEVICE 1" in FIG. 1) 110 and a second device ("DEVICE 2" in FIG. 1) device 111, either of which may be any suitable computing device capable of connecting to and transmitting communications via the network environment 100.

As illustrated in FIG. 1, the network environment 100 includes multiple connected autonomous systems, namely, Internet Service Provider (ISP) 1 autonomous system (AS) 102, ISP 2 AS 104, a carrier AS 106, and a primary AS 108. Although labelled as an ISP or carrier AS, such labels are merely intended to provide examples of possible autonomous systems within a network environment in which the anti-spoofing functionality described herein may be implemented. Also, the primary AS 108 is referred to as being "primary" for illustrative purposes only and only due to its connection to the second device 111. In light of the foregoing, it should be appreciated that the network environment 100 is merely one example of a network environment to which the present disclosure applies. Rather, implementations of the present disclosure may be applied to any type of telecommunications network that utilizes IP addresses for connecting an end user to one or more components of the network.

To facilitate routing through the network environment 100, routing information may be exchanged through announcements using a particular protocol, such as Border Gateway Protocol (BGP) announcements. In general, BGP information (or BGP session, BGP feed, or BGP data) includes a table of Internet Protocol (IP) prefixes which designate network connectivity between autonomous systems or separate networks. BGP information for a network route may include path (including next-hop information), network policies, and/or rule-sets for transmission along the path, among other information. The BGP feed may also include Interior Gateway Protocol (IGP) information for network routes within an AS or network and/or other network information that pertains to the transmission of content from the network. However, BGP information mainly describes routes used by the autonomous systems to connect to external networks or customers while IGP information describes routes through a given autonomous system to connect one provider edge to another provider edge through the autonomous system.

Referring to the network environment 100, during communication between the first device 110 and the second device 111, the first device 110 may generate data/communication packets including data to be delivered to the second device 111. In addition to the data being delivered to the second device, such packets generally include header information to facilitate routing and other functionality within the network. For example, in IP-based networks, IP packets generally include a header containing, among other things, each of a source IP address and a destination IP address. Based on the destination IP address and routing information announced and distributed throughout the network, a packet originating at the first device 110 containing the destination IP address of the second device 111 may be passed through various network devices of the autonomous systems 102-108 until it arrives at the second device 111. Such transmission of the packet is facilitated by the routing information exchanged between the devices of the various autonomous systems 102-108, which, as noted above, may include BGP, IGP, or similar routing information.

After receiving a packet, the second device 111 may be configured to generate and transmit a response packet back to the first device 110. To do so, the second device 111 may obtain the source IP address of the first device 110 from the header of the packet received from the first device 110 and insert it as the destination address for the responsive packet.

This basic functionality may be exploited by a malicious device 112 to facilitate DDoS or other attacks. More specifically, the malicious device 112 may insert a forged or "spoofed" source address in a packet that it then transmits to the second device 111. The spoofed address may in certain cases, simply be a random address. Alternatively, the source address may correspond to a trusted device (e.g., if the malicious device 112 is being used to impersonate the trusted device) or a target device (e.g., if the malicious device 112 is being used to flood the target device with responses from the second device 111, such as in a DDoS attack).

Figure 2:
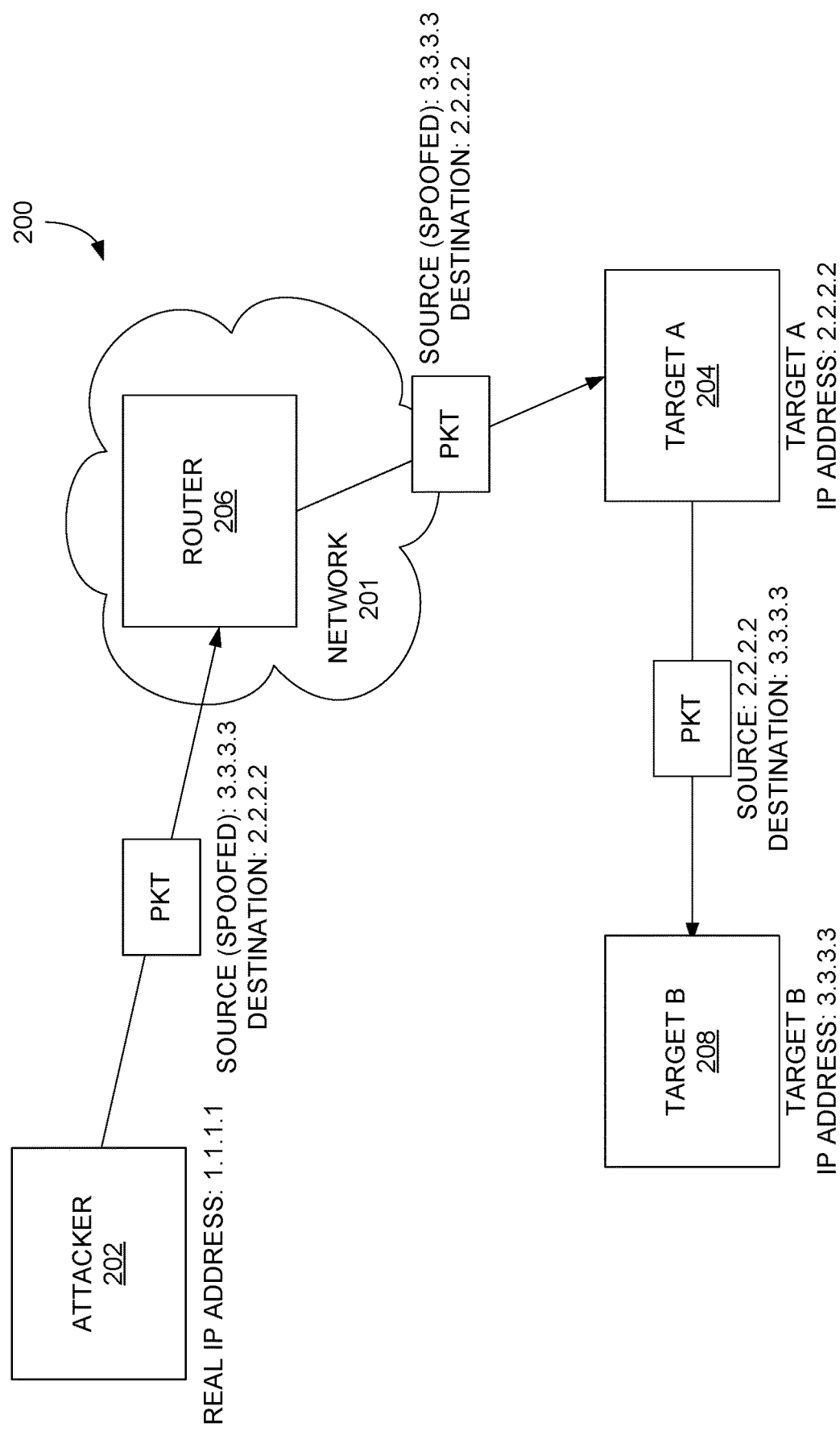
FIG. 2 is a diagram illustrating a method for utilizing a spoofed Internet Protocol (IP) address to attack a network device.

FIG. 2 is a diagram 200 illustrating in greater detail how an attacker 202 of a device or network may utilize a spoofed Internet Protocol (IP) address to gain access to a target or overwhelm a target while hiding the identity of the attacker.

As shown, an attacker 202 transmits a communication/packet (PKT) to a router 206 or other routing device of a network 201. In one example, the communication is for content or similar resources from another device of the network. Typically, such communications include a header with a source IP address associated with the transmitting device 202 and a destination IP address of a device or network for which the communication is intended. However, this header may be modified by the sending device 202 to forge or "spoof" a source IP address. In this example, the attacker device 202 has a registered IP address of 1.1.1.1. However, when providing the packet to the network 102, the attacker 202 may spoof the source IP address as 3.3.3.3. The destination IP address (2.2.2.2) defines the device or network under attack through the spoofed source IP address.

Upon receiving the communication, the router 206 of the network 201 routes the communication to the device associated with the destination IP address (2.2.2.2). In this example, the destination device is target A 204 at IP address 2.2.2.2. However, the source IP address included in the communication from the attacker 202 has been altered to another IP address not associated with the attacker device. In this example, the attacker device 202 spoofs the source IP address as 3.3.3.3. This operates to attack either target device A 204 or target device B 208. In particular, the communication sent from the attacking device 202 may be an attempt to gain access to target device A 204. Target device A 204 may be configured only to provide access to trusted devices identified through the source IP address included in the header of the communication. Thus, by spoofing a source IP address of a trusted computer (such as target device B 208 with IP address 3.3.3.3), the attacking device 202 may gain access to the target device A 204 by posing as the trusted computer.

In another example, the communication sent to destination IP address 2.2.2.2 may be a request for content from the destination device, which, in the example of FIG. 2 is target A 204. Generally, the target device 204 returns the requested content to the source IP address included in the header of the request. Thus, following receipt of a request including the spoofed source IP address of 3.3.3.3, target A 204 provides the requested content to target B 208, even though target B 208 did not actually request the content. The attacking device 202, in this circumstance, does not intend to receive the requested content. Rather, the attacker 202 may request content be sent to target B 208 to overwhelm target B 208 with unrequested content. In some instances, such requests may be sent by any number of devices as part of a coordinated attack on target B 208 in an effort to disable target B 208. In a similar manner, the spoofed IP address may be utilized as part of a DDoS attack on target A 204 by flooding the target device with requests for content. However, the attacking device 202 may disguise the source of the attack through a spoofed source IP address to avoid detection. In any circumstance, the use of the spoofed source IP address may negatively affect the performance and efficiency of the network 102 or the targeted devices or networks.

Figure 3:
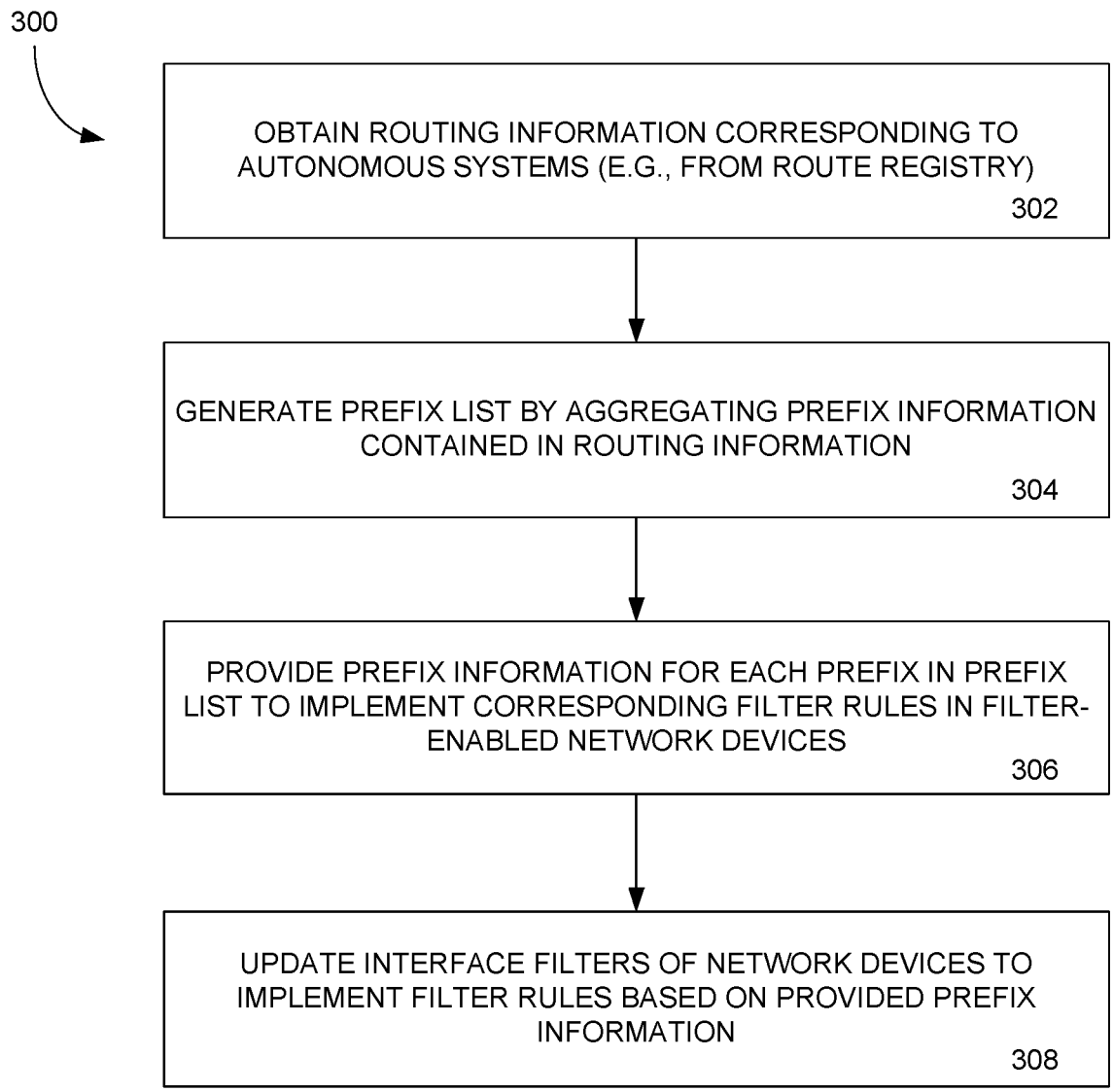
FIG. 3 is a flow chart illustrating a method for updating interface filters to block spoofed traffic.

Referring back to FIG. 1, to reduce spoofed traffic within the network environment 100, an anti-spoofing system 114 may be implemented according to the present disclosure. In general, the anti-spoofing system 114 provides a mechanism by which interface filters of routers (e.g., router R1 120 and router R2 122) or other network devices having filtering functionality are dynamically updated with a list of trusted or verified prefixes. Reference is also made to FIG. 3, which is a flow chart illustrating a method 300 for updating interface filters to prevent transmission of spoofed traffic.

As illustrated in FIG. 1 and operation 302 of the method 300, the anti-spoofing computing device 116 receives, collects, or otherwise obtains routing information for each of a first AS 102 ("ISP 1 AUTONOMOUS SYSTEM" in FIG. 1), a second AS 104 ("ISP 2 AUTONOMOUS SYSTEM" in FIG. 1), and carrier AS 106 with the routing information for each AS 102-106 corresponding to routes that are maintained and administered by an operator of the respective AS. The obtained routing information may be stored within the system 114, such as in a route data source 118 for processing by the anti-spoofing computing device 116.

In certain implementations, the routing information is provided to the anti-spoofing computing device 116 by operators of the autonomous systems 102-108, such as in conjunction with a route registration process. For example, each operator associated with one of the autonomous systems 102-108 may maintain a respective list of prefixes corresponding to the routes it manages. The operator may then periodically transmit the list of prefixes to a route registry accessible by the anti-spoofing computing device 116. The route registry therefore provides a master list of register routes for access by the anti-spoofing computing device 116. Alternatively, each operator may directly communicate its respective list of prefixes to the anti-spoofing computing device 116 for storage in the route data source 118.

In other implementations, the routing information may be provided to the anti-spoofing computing device 116 in conjunction with the BGP announcement process. As previously discussed, when communication between different autonomous systems is facilitated using BGP, each autonomous system announces its routing information to its neighbors/peers, e.g., by exchanging routing tables including prefixes associated with the autonomous system. To the extent there is a change to the routing information for a given autonomous system, a subsequent exchange of routing information occurs, thereby updating its neighbors.

In certain implementations of the present disclosure, this exchange of routing information may be leveraged to update the routing information available to the anti-spoofing computing device 116. For example, in one implementation, whenever routing information is exchanged with a neighbor of an autonomous system, a device within or associated within the autonomous system may also transmit the routing information to the anti-spoofing computing device 116. Similarly, an exchange of routing information between autonomous systems may cause a device within or associated within the autonomous system to send a notification to the anti-spoofing computing device 116 such that the anti-spoofing computing device 116 may then request or otherwise collect the updated routing information.

After obtaining the routing information, the anti-spoofing computing device 116 may then processes and analyze the collected routing information to generate a prefix list (operation 304). In implementations in which the routing information for each autonomous system includes one or more prefixes, processing the routing information may include extracting each prefix from the collected routing information and storing the extracted prefixes in a table, list, or similar aggregated format or data structure.

In certain implementations, the anti-spoofing computing device 116 may further process the prefix list to consolidate the prefix list entries where possible. For example, if two prefixes encompassing consecutive and/or duplicate ranges of addresses are included in the prefix list, they may be combined into a single prefix combining the consecutive ranges, thereby reducing the total number of prefixes in the prefix list.

It should also be understood that in addition to or instead of prefixes, the anti-spoofing computing device 116 may also receive specific device addresses or ranges of device addresses for incorporating into the prefix list. Such device addresses may be included in the received routing information or may be provided separately as known trusted devices. To the extent the anti-spoofing computing device 116 receives such address information, it may determine whether the corresponding addresses are already encompassed by prefixes within the prefix list and, if not, may specifically add the addresses to the prefix list.

Regardless of how the prefix list is generated, the prefixes included in the prefix list are generally obtained from trusted autonomous systems/network operators. Accordingly, each of the prefixes in the prefix list generated by the anti-spoofing computing device 116 may generally be considered a legitimate or safe source of packets.

Following generation of the prefix list, the anti-spoofing computing device 116 distributes, "pushes", or otherwise provides the information contained in the prefix list to routers or other network devices that include filtering functionality (operation 306). For example, as illustrated in FIG. 1, the anti-spoofing computing device 116 transmits instructions for implementing filter rules based on the prefix list to each of router R1 120 and router R2 122 of the primary AS 108. It should be understood, however, that similar instructions may be sent to any device that provides filtering functionality and that any reference to the routers 120, 122 is intended merely as an example.

In certain implementations, different filters may be generated for different network devices based on, among other things, the network devices relationship to other network devices, networks, or similar elements of a broader network environment. For example, in the network environment 100, different filters for each of router R1 120 and router R2 122 may be generated based on their connection to carrier AS 106 and ISP 2 AS 104, respectively. For example and among other differences, the filter generated for router R2 122 may exclude any filter rules directed to traffic originating from sources within carrier AS 106 or any other autonomous systems that would be handled entirely by router R1 120. In other words, each filter may be specifically generated for a given network device such that extraneous filter rules are avoided and the filter is directed only to traffic that the network device may encounter. By doing so, memory and processing resources of the network device may be conserved (e.g., by avoiding unnecessary processing power expenditure on executing extraneous filter rules) and/or used to provide improved filtering (e.g., by using the additional memory to implement additional filter rules).

In certain implementations, the prefix list itself or portions of the prefix list may be transmitted to the routers 120, 122 in a prefix list message that may further include a script or other executable instructions that, when received and executed by the routers, causes the routers 120, 122 to update internal configuration information based on the received prefix list. For example, the instructions may cause the routers 120, 122 to update existing filter rules or implement new filter rules to permit traffic from addresses encompassed by the prefixes of the prefix list. In such cases, the anti-spoofing computing device 116 may be adapted to generate prefix list messages and corresponding instructions according to the specific type or vendor of the network device to receive the prefix list. In other implementations, the anti-spoofing computing device 116 may generate and transmit a specific instruction for each prefix of the prefix list to the routers 120, 122, each instruction causing the routers 120, 122 to implement a corresponding filter rule permitting traffic associated with the particular prefix.

In other implementations, the anti-spoofing computing device 116 may alternatively make the prefix list available as opposed to generating and transmitting instructions to network devices. For example, upon generating an updated prefix list, the anti-spoofing computing device 116 may notify network devices that an update is available. In response, the network device may retrieve the updated prefix list and implement filter rules based on the prefix list. Alternatively, the anti-spoofing computing device 116 may notify or otherwise communicate with a computing device associated with an autonomous system of the network environment 100, e.g., a computing device associated with an operator of the autonomous system. In response, the computing device associated with the autonomous system may then retrieve the updated prefix list from the anti-spoofing computing device 116 and implement corresponding filters within the autonomous system.

In response to receiving the information corresponding to the prefix list, each of router R1 120 and router R2 122 may update internal configuration information related to handling and filtering of received packets (operation 308). With respect to handling traffic, the routers 120, 122 may update internal routing tables based on the prefix list information. The routers 120, 122 may also update an internal collection of filter rules. For example, the routers 120, 122 may update one or more filter rules corresponding to approved packet sources (i.e., a "whitelist") maintained by the routers 120, 122 and applied at a port/interface level using an interface filter. Accordingly, when the routers 120, 122 receive a packet, the routers 120, 122 may check the source IP of the packet against the whitelist. If the source IP of the packet is on the whitelist, the routers 120, 122 may forward the packet as usual. However, if the source IP address of the packet is not on the whitelist, the receiving router may "sink" or otherwise not forward the packet under the assumption that the packet originated from an untrusted, unknown, or potentially spoofed IP address.

In certain implementations, the routers 120, 122 may maintain a log or similar record of packets not forwarded due to their exclusion from the whitelist. For example, every time one of the routers 120, 122 rejects a packet, it may generate a log entry including a date/timestamp, the source IP address of the packet, the destination IP address of the packet, the size of the packet, or any other relevant information. In certain implementations, such logs may be collected, received, or otherwise obtained by the anti-spoofing computing device 116 for processing and analysis. The anti-spoofing computing device may also be configured to extract the source IP addresses from the log information and to generate a "blacklist" of source IP addresses that may then be pushed or otherwise distributed to routers or other network devices within the network environment 100. Such network devices may then update their internal configuration based on the received blacklist to block, sink, or otherwise reject packets having source IP addresses included on the blacklist.

The processes of obtaining routing information, disseminating prefix lists to network devices of the network environment 100, or otherwise implementing filters in network devices according to the approaches discussed herein may be conducted on a regular or periodic basis or in response to additions, removals, or other changes to the network environment 100 or other events related to the network environment 100. By doing so, the interface filters of the network devices may be maintained in a current/up-to-date state that reflects recently identified sources of potentially spoofed traffic. For example, as previously noted, ISPs and similar networking organizations may register routes they own or serve in route registries. Accordingly, in at least one implementation of the present disclosure, the anti-spoofing system 114 may be configured to execute any of the foregoing functions related to generating and disseminating filters for network devices in response to changes in the route registry.

As noted above, in certain implementations, the data provided to the routers 120, 122 or otherwise used for purposes of updating filter rules of the routers 120, 122 may be in the form of a prefix list. In certain implementations, the prefix list may be an array, table, or similar data structure storing each individual prefix in a standard format (e.g., in "slash" notation). So, for example, an IPv4-based implementation of the present disclosure may generate a prefix list in the form of an array, such as, [5.240.128.0/24, 6.97.144.0/16; 250.91.0.0/16, 205.223.255.0/8, 40.225.0.0/16].

The use of a prefix list is particularly efficient in implementations of the present disclosure because certain common routing protocols, such as BGP and other protocols used to exchange data between different autonomous systems, exchange routing information in the form of prefixes. Accordingly, the anti-spoofing computing system takes advantage of how BGP-enabled networks exchange routing information. Nevertheless, it should be appreciated that the prefix list generated in operation 308 may be replaced with any combination of prefixes, specific IP addresses, or any other suitable identifier that may be attributed to a network or device. For example, in certain implementations the routing information collected in operation 302 may include routing tables consisting of specific legitimate IP addresses. In such cases, the list generated in operation 308 and distributed by the anti-spoofing computing system may include each specific IP address and each interface filter may be updated to permit traffic from each of the specific IP addresses.

FIG. 4 is a block diagram illustrating an example of a computing device or computer system 400 which may be used in implementing the embodiments of the network disclosed above. In particular, the computing device of FIG. 4 is one embodiment of any of the devices that perform one of more of the operations described above. For example, such devices may include any of the devices of the network environment 100 illustrated in FIG. 1 and, in particular, the anti-spoofing computing device 116 of the anti-spoofing system 114. The computer system 400 includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 418 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of a machine-readable media may include, but is not limited to, magnetic storage media; optical storage media (e.g., CD-ROM); magneto-optical storage media; read only memory (ROM); random access memory (RAM); erasable programmable memory (e.g., EPROM and EEPROM); flash memory; or other types of media suitable for storing electronic instructions.

Embodiments of the present disclosure include various operations, which are described in this specification. The steps may be performed by hardware components or may be embodied in machine-executable instructions, which may be used to cause a general-purpose or special-purpose processor programmed with the instructions to perform the operations. Alternatively, the operations may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method for blocking spoofed traffic within communications networks, the method comprising:
obtaining, at a computing system, routing information for an autonomous system of a communications network, the routing information identifying Internet Protocol (IP) addresses associated with the autonomous system;
in response to receiving the routing information, generating, at the computing system, a prefix list based on the routing information, the prefix list including one or more prefixes encompassing the IP addresses identified by the routing information; and
transmitting, from the computing system to a network device of the communications network, instructions configured to cause the network device to update an interface filter of the network device based on the prefix list such that the network device permits network traffic that originates from IP addresses within the one or more prefixes of the prefix list and blocks network traffic that originates from IP addresses not within the one or more prefixes of the prefix list from a second network.

2. The method of claim 1, wherein the routing information includes at least one of Border Gateway Protocol (BGP) routing information and Interior Gateway Protocol (IGP) routing information announced by the autonomous system.

3. The method of claim 1, wherein generating the prefix list comprises extracting and aggregating prefixes included in the routing information.

4. The method of claim 1, wherein the instructions are first instructions, the method further comprising:
obtaining a source address at the computing system, the source address associated with a source of traffic to be blocked within the communications network; and
transmitting second instructions from the computing system to the network device, the second instructions configured to cause the network device to update the filter function such that the network device blocks traffic that originates from the source address.

5. The method of claim 1, wherein obtaining the routing information comprises retrieving the routing information from a route registry, the route registry storing routing information provided to the route registry by a computing device associated with the autonomous system.

6. The method of claim 1, wherein the network device is a first network device and the instructions are first instructions, the method further comprising:
transmitting, from the computing system to a second network device, second instructions configured to cause the second network device to update a filter function of the second network device based on the prefix list such that the second network device permits network traffic that originates from IP addresses within the one or more prefixes of the prefix list.

7. A system for use in blocking spoofed traffic within communications networks, the system comprising:
a computing system comprising at least one processor and a memory, the memory comprising instructions that, when executed by the at least one processor, cause the at least one processor to:
obtain routing information for an autonomous system of a communications network, the routing information identifying Internet Protocol (IP) addresses associated with the autonomous system;
in response to receiving the routing information, generate a prefix list based on the routing information, the prefix list including one or more prefixes encompassing the IP addresses identified by the routing information; and
transmit, to a network device of the communications network, first instructions configured to cause the network device to update an interface filter of the network device based on the prefix list such that the network device permits network traffic that originates from IP addresses within the one or more prefixes of the prefix list and blocks network traffic that originates from IP addresses not within the one or more prefixes of the prefix list from a second network.

8. The system of claim 7, wherein the routing information includes at least one of Border Gateway Protocol (BGP) routing information and Interior Gateway Protocol (IGP) routing information.

9. The system of claim 7, wherein the instructions further cause the at least one processor to:
obtain a source address associated with a source of traffic to be blocked; and
transmit second instructions to the network device, the second instructions configured to cause the network device to update the filter function such that the network device blocks traffic that originates from the source address.

10. The system of claim 7, wherein the instructions further cause the at least one processor to obtain the routing information by retrieving the routing information from a route registry, the route registry storing routing information provided to the route registry by a computing device associated with the autonomous system.

11. The system of claim 7, wherein the network device is a first network device and the instructions further cause the processor to:
transmit second instruction to a second network device within the communications network, the second instructions configured to cause the second network device to update a filter function of the second network device based on the prefix list such that the second network device permits network traffic that does originates from IP addresses within the one or more prefixes of the prefix list.

12. The system of claim 7, wherein the instructions cause the at least one processor to generate the prefix list by extracting and aggregating prefixes included in the routing information.

13. A method for blocking spoofed traffic within communications networks, the method comprising:
generating, at a computing system, a prefix list from routing information associated with an autonomous system of a communications network, the prefix list including a plurality of prefixes encompassing trusted addresses within the autonomous system; and
distributing the plurality of prefixes from the computing system to an interface filter within the communications network, the distributing for implementation of a filter rule at the filter device, the filter rule permitting network traffic originating from addresses within the plurality of prefixes and blocking network traffic that originates from IP addresses not within the plurality of prefixes from a second network.

14. The method of claim 13, wherein the routing information includes at least one of Border Gateway Protocol (BGP) routing information and Interior Gateway Protocol (IGP) routing information for the autonomous system.

15. The method of claim 13, wherein distributing the portion of the prefix list comprises transmitting instructions from the computing system to the filter device, the instructions to cause the filter device to update the filter rule to permit network traffic originating from addresses within the plurality of prefixes.

16. The method of claim 13, wherein distributing the portion of the prefix list comprises:
 receiving, at the computing system, a request for the prefix list from at least one of the filter device and a computing device associated with the filter device; and
 providing the plurality of prefixes from the computing system to the at least one of the filter device and the computing device.

17. The method of claim 13 further comprising:
 generating, at the computing system, an address blacklist including a blocked address corresponding to a source from which traffic is to be blocked; and
 distributing the address blacklist, from the computing system to the filter device, the distributing of the address blacklist for implementing a second filter rule at the filter device, the second filter rule to block network traffic originating from addresses on the blacklist including the blocked address.

18. The method of claim 13 further comprising distributing the plurality of prefixes from the computing system to a second filter device within the communications network, the distributing to the second filter device for implementation of a second filter rule at the second filter device, the second filter rule permitting network traffic originating from addresses encompassed by the plurality of prefixes.

19. The method of claim 13 further comprising obtaining the routing information from a route registry containing routing information provided by a computing device associated with the autonomous system during a route registration process.

* * * * *